United States Patent
Fang et al.

(10) Patent No.: US 7,996,879 B1
(45) Date of Patent: Aug. 9, 2011

(54) NETWORK DEPLOYMENT TECHNIQUES EMPLOYING RADIO FREQUENCY IDENTIFICATION (RFID)

(75) Inventors: Chao Fang, Nanjing (CN); Yan Gu, Nanjing (CN); Jialai Zhu, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 772 days.

(21) Appl. No.: 11/773,045

(22) Filed: Jul. 3, 2007

(51) Int. Cl.
*G06F 17/00* (2006.01)
*G06F 7/04* (2006.01)

(52) U.S. Cl. .............. 726/1; 726/2; 726/3; 709/223; 709/225

(58) Field of Classification Search ............ 726/1, 2, 726/3; 709/223, 225
See application file for complete search history.

(56) References Cited

U.S. PATENT DOCUMENTS

| | | | |
|---|---|---|---|
| 6,748,544 B1 * | 6/2004 | Challener et al. | 726/17 |
| 7,099,932 B1 * | 8/2006 | Frenkel et al. | 709/223 |
| 7,667,603 B2 * | 2/2010 | Bolander et al. | 340/572.4 |
| 7,856,652 B2 * | 12/2010 | Hieda | 726/1 |
| 2004/0263319 A1 * | 12/2004 | Huomo | 340/10.2 |
| 2006/0168644 A1 * | 7/2006 | Richter et al. | 726/2 |
| 2007/0011269 A1 * | 1/2007 | Jeon et al. | 709/217 |
| 2007/0011893 A1 * | 1/2007 | Garber et al. | 33/286 |
| 2007/0028298 A1 * | 2/2007 | Snyder et al. | 726/3 |
| 2007/0040654 A1 * | 2/2007 | Lee et al. | 340/10.1 |
| 2007/0156695 A1 * | 7/2007 | Lim | 707/9 |
| 2007/0294101 A1 * | 12/2007 | Dalal et al. | 705/1 |
| 2008/0129460 A1 * | 6/2008 | Abraham | 340/10.1 |
| 2008/0176578 A1 * | 7/2008 | Boss et al. | 455/456.1 |
| 2008/0204199 A1 * | 8/2008 | Howarth et al. | 340/10.1 |
| 2008/0222692 A1 * | 9/2008 | Andersson et al. | 726/1 |
| 2009/0006850 A1 * | 1/2009 | Birger et al. | 713/169 |
| 2009/0055897 A1 * | 2/2009 | Morgan et al. | 726/3 |
| 2009/0077674 A1 * | 3/2009 | Shin et al. | 726/31 |
| 2009/0315670 A1 * | 12/2009 | Naressi et al. | 340/5.8 |
| 2010/0061294 A1 * | 3/2010 | Proctor et al. | 370/328 |

\* cited by examiner

*Primary Examiner* — William Korzuch
*Assistant Examiner* — Sarah Su
(74) *Attorney, Agent, or Firm* — IP Strategy Group, P.C.

(57) ABSTRACT

A method for facilitating connection between an entity's network and a first electronic device is provided. The method includes receiving, using an RFID (radio frequency identification) reader associated with the first electronic device, a first file from an RFID tag, the RFID tag being provided by the entity. The method also includes obtaining connection information from the first file, the connection information including at least one of a security policy and network configuration. The method further includes enabling a user to attempt to log in via the first electronic device, using the connection information, into the network, wherein the log in is attempted using a different connection modality than that employed to receive the first file from the RFID tag.

19 Claims, 2 Drawing Sheets

NETWORK DEPLOYMENT TECHNIQUES EMPLOYING RADIO FREQUENCY IDENTIFICATION (RFID)

BACKGROUND OF THE INVENTION

Advances in technology have proliferated the usage of electronic devices such as computers, laptops, personal digital assistants (PDAs), smart devices, and the likes. In today's society, entities have quickly embraced electronic devices by creating an environment that provides users with mobility and flexibility. In an example, public libraries now provide free internet access to the public. However, before a user may access the internet through the access service provided by a public library, the library may require the user to configure the electronic devices to comply with the library's security policy.

Consider the situation wherein, for example, a user wants to access the internet with his personal laptop while he is at the library. The user may first connect his electronic device to the library's network. In an example, the user may connect his personal laptop to the library's LAN (local area network). Then the user may configure the network connection of his electronic device. In an example, to perform network configuration, the user may have to set up his personal laptop with the library's IP address. Once the network configuration has been completed, the user may install the security policy. In an example, the user may have to download and install the security certificate.

Some entities may also offer wireless access. Once the user has established a LAN connection with the entity, the user may be able to set up wireless access. To establish a wireless connection, the user may have to perform wireless configuration.

A major disadvantage with this process is that users are expected to configure their electronic devices to make the electronic devices compatible with the entity's network. As can be appreciated from the foregoing, the process of configuring the electronic device may be a daunting task for many users. Typical users may find the task of configuring their electronic devices a complex and frustrating process since most users may not have the time, skill and/or desire to perform the configuration.

Unfortunately, the steps for installing a security policy may have to be repeated often since each entity may have a different network configuration and/or may have different security policy. Additionally, some entity may have more than one security policy. In an example, to access information about research and development, a user may have to have a higher security authorization than what may be generally applied throughout the company. In another example, different branches may have different security policies. Thus, an employee that may have to travel to a different branch may be required to reconfigure his electronic device in order to access the company's network.

Memory cards may be employed to assist in the task. The security policy may be saved onto the memory card, such as USB, SD card, and the like. A user may couple the memory card to his electronic device in order to install the security policy. This method usually does not require the user to manually perform network configure on his electronic device.

However, there are several limitations to this method. For example, memory cards are usually small devices that may be easily misplaced. Also, even though network configuration may not be required, the user may have to perform interface configuration since the drivers on the memory cards may not be able to automatically communicate with the electronic devices. In addition, some entities may not allow the utilization of memory cards because the entities may want to prevent the unauthorized copy of confidential information. Further, the entities may want to limit exposure to malicious codes by preventing the spread of malicious codes through memory cards. As a result, even though the utilization of memory cards may solve the need for network configuration, the use of memory cards may create other problems.

BRIEF SUMMARY OF THE INVENTION

The invention relates, in an embodiment to a method for facilitating connection between an entity's network and a first electronic device. The method includes receiving, using an RFID (radio frequency identification) reader associated with the first electronic device, a first file from an RFID tag, the RFID tag being provided by the entity. The method also includes obtaining connection information from the first file, the connection information including at least one of a security policy and network configuration. The method further includes enabling a user to attempt to log in via the first electronic device, using the connection information, into the network, wherein the log in is attempted using a different connection modality than that employed to receive the first file from the RFID tag.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
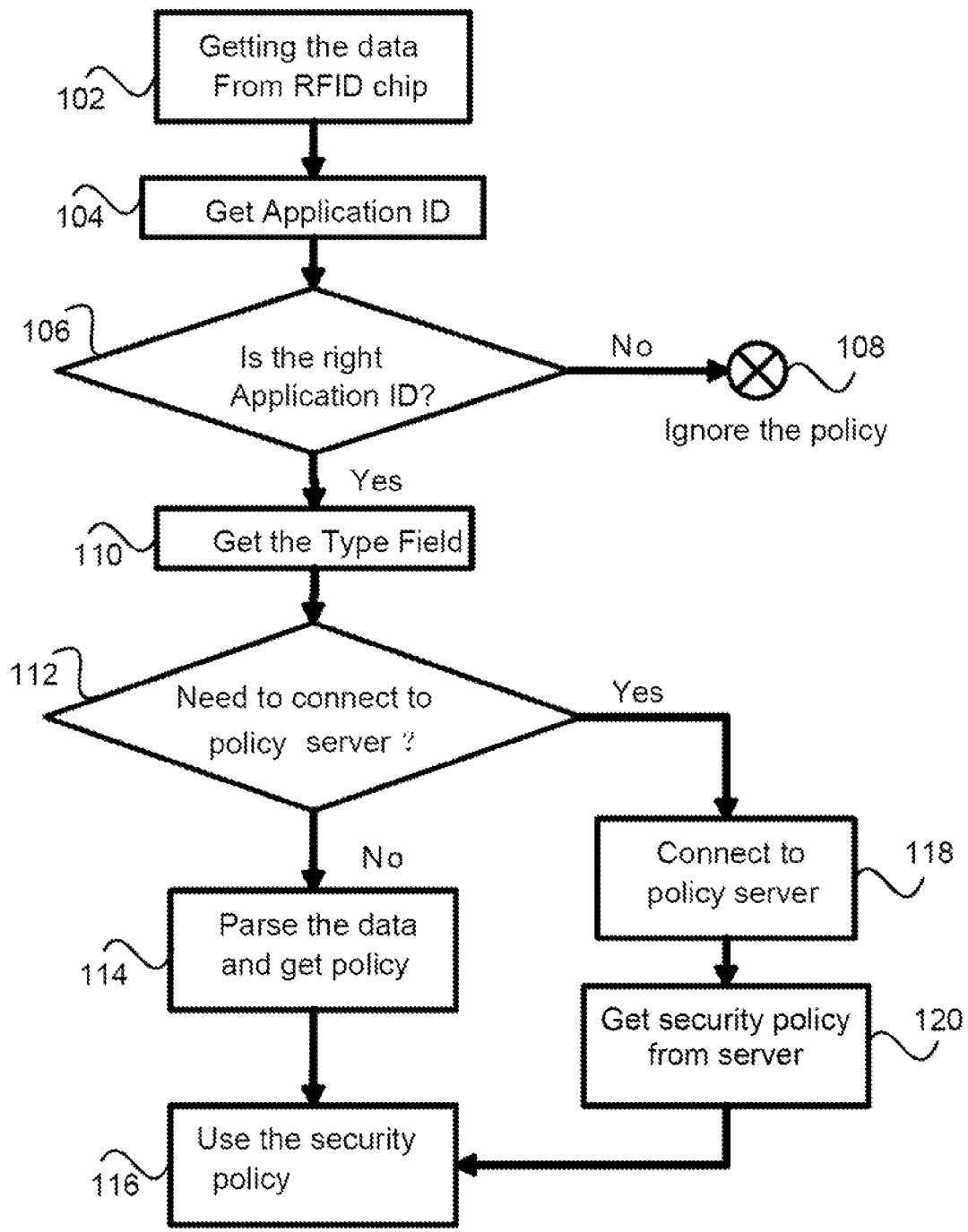
FIG. 1 shows, in an embodiment of the invention, a simple flowchart illustrating a technique for deploying a security policy through a radio-frequency identification (RFID) arrangement.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that include a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In recent years, radio-frequency identification (RFID) has become a popular method of remotely storing and transmitting data. The RFID may be implemented as an RFID tag, which is an integrated chip attached to an antenna. The amount of information that may be stored on an RFID tag may vary depending upon the memory capacity of the integrated chip. To read the data stored on the RFID tag, an RFID reader may be employed. In other words, the RFID reader may match the frequency with which the antenna may wirelessly transmit the data stored on the integrated chip to read the data. Current technology has made the RFID reader readily available. In an example, an RFID reader may be built into an electronic device. In another example, an RFID reader may be a hardware that may be attached to an electronic device.

In one aspect of the invention, the inventors herein believed that deployment of security policy may be more efficiently achieved by implementing RFID. RFID tags are inexpensive, and RFID readers may be easily attained. The inventors herein realized that by incorporating RFID as part of a deployment solution, security issues may arise. In an example, the user's RFID reader may be able to detect data stored on an RFID tag. However, the user's RFID reader is unable to determine the authenticity of the data. Thus, the user's electronic device may be susceptible to malware attacks. Thus, the inventors realized that the RFID arrangement needs to be coupled with a security arrangement in order to minimize the risk to the user's electronic device and/or the data stored on the user's electronic device.

In accordance with embodiments of the invention, an RFID deployment technique may be provided. The RFID deployment technique includes an RFID arrangement coupled with a deployment application program, which is an application program that enables a user's electronic device to interact with the downloaded data. In addition, the deployment application program may provide a user's electronic device protection against potential malware attacks. Additionally or alternatively, embodiments of the invention include coupling the RFID deployment technique with an encryption arrangement as additional security measures for the user's electronic device.

In an embodiment of the invention, an RFID deployment technique may include employing an RFID reader to interact with an RFID tag to read a security policy file. In the prior art, accessing the security policy may require a complicated long drawn-out process requiring the user to perform network configuration. However, with the RFID deployment technique, a user is not required to perform complicated network configuration. Instead, the user may simply download the data onto his electronic device by employing an RFID reader.

Even if the network configuration may be avoided in the prior art by employing a portable memory device (e.g., flash memory, compact flash, etc.), the security policy saved on the portable memory device is usually only accessible to a single individual at any one time. However, with the RFID deployment technique, the security policy may be made available to any individual users within the signal range of the RFID tag implemented by the entity. As can be appreciated from the foregoing, a signal range of an RFID tag may vary. In an example, some RFID tags may only have a signal range of a few centimeters while other RFID tags may have a signal range of up to a few meters.

Unlike the prior art memory device deployment method, the RFID tag is highly unlikely to be misplaced even though the RFID tag is physically smaller than most memory devices. In an embodiment, the RFID tag may be incorporated into an object. In an example, the RFID tag may be embedded into the wall of a room. As can be appreciated from the foregoing, since an RFID tag is a minuscule device, the RFID tag may be unobtrusively positioned, enabling easy access to the data stored on the RFID tag without being unsightly.

As aforementioned, the RFID tag may include data for enabling a user to access the network. As can be appreciated from the foregoing, the amount of data that may be stored on an RFID tag may depend upon an entity's preference. In an embodiment, the RFID chip of the RFID tag may store an entire security policy. In another embodiment, the RFID chip may only store instructions for retrieving the security policy. Additionally or alternatively, the amount of data stored on the RFID tag to enable RFID deployment may also be dependent upon the memory capacity of the RFID tag. In other words, the larger the memory size, the more data the RFID tag may stored.

Once the data stored on the RFID tag has been downloaded onto a user's electronic device (e.g., laptop, smart device, pocket PC, etc.), a deployment application program may be employed to automatically install the security policy onto the user's electronic device, in an embodiment. As discussed herein, a deployment application program refers to an application program that may be installed onto an electronic device, enabling the electronic device to interact with the downloaded data.

As aforementioned, security issues may arise with the implementation of RFID. In an embodiment, the deployment application program may be configured to perform authenticity verification. In an attempt to prevent unscrupulous individuals from mimicking a valid security policy in order to gain access to a user's electronic device, the deployment application program may perform authenticity verification before installing the downloaded data. In an embodiment, authenticity may be validated by comparing an application identification (ID) stored on the downloaded file against a set of valid application IDs. As can be appreciated from the foregoing, the deployment application program that a user may have on his electronic device may be tailored specifically for an entity. As a result, the deployment application program may have the list of valid application IDs built into the code, enabling the deployment application program to perform authenticity verification.

As an additional security measure, the deployment application program may also be configured to perform decryption, in an embodiment. Examples of encryption/decryption methods that may be employed may include symmetric cryptography algorithm and asymmetric cryptography algorithm. Since the deployment application program is specific for an entity, the deployment application program may be programmed to only decrypt the downloaded data with the valid encryption.

The features and advantages of the present invention may be better understood with reference to the figures and discussions that follow.

FIG. 1 shows, in an embodiment of the invention, a simple flowchart illustrating a technique for deploying a security policy through an RFID arrangement.

At a first step 102, a user's RFID reader may be employed to access data on an RFID chip of an RFID tag that is provided by the entity. Since the RFID tag is physically small, the RFID tag may be located inconspicuously in a public place that is easily accessible to individuals who may need to read the information stored on the RFID chip. In an example, the RFID tag may be embedded into the wall of the room. In another example, the RFID tag may be embedded into a heavy piece of furniture.

As can be appreciated from the foregoing, even though the RFID tag is small, the RFID tag does not suffer from the same problem as the prior art memory device method since the RFID tag emits a frequency that enables an RFID reader to detect the frequency and read the data on the RFID tag. In contrast, the prior art memory device method usually requires the memory device to be plugged into the electronic device in order for the electronic device to be able to read the data stored on the memory device. Thus, if the memory device is misplaced, the user is unable to perform the security policy installation without having to request for another copy of the security policy.

In some situations, the entity may want to attach the RFID tag to a portable object. In an example, an enterprise may want to make a part of the network easily accessible to visitors, such as an employee from another branch. The enterprise may opt to embed the RFID tag onto a temporary guest badge. With the badge, a guest user may have authorization to access certain sections of the enterprise's network. In an example, the enterprise may give the guest user access to the Internet. Thus, the enterprise may provide the guest user with a service via the RFID tag on the temporary guest badge while controlling network access.

Once the data has been located, the RFID reader, which may be integrated with the user's electronic device or may be a communicably-coupled device to the user's electronic device, may download the data stored on the RFID chip onto the electronic device. In an embodiment, the user's electronic device may include a deployment application program, which may enable the electronic device to interact with the downloaded data.

At a next step 104, the data may be parsed to extract an application ID. As discussed herein, an application ID is a unique identifier that may be specifically assigned to an entity. The application ID may be employed as a preventive measure to minimize the possibility of an unauthorized version of a security policy being executed on a user's electronic device.

At a next step 106, the deployment application program may perform authenticity verification to determine the validity of the application ID. As can be appreciated from the foregoing, the deployment application program that may be installed on an electronic device may be specifically for an entity. As a result, the deployment application program may have the list of valid application IDs built into the code, enabling the deployment application program to perform authenticity verification.

If the application ID is invalid, then at a next step 108 the deployment application program may stop processing the downloaded data. In an embodiment, an error message may be displayed.

However, if the application ID is valid, then at a next step 110, the deployment application program may continue to parse the data to retrieve the type field. As discussed herein, a type field refers to a string of data that may provide status about the security policy of the downloaded data. In an embodiment, the RFID tag may include the entire security policy. If the entire security policy has been downloaded, the type field may have a status of complete. In another embodiment, the RFID tag may include instructions for downloading the security policy, which may be stored on a network server. If the entire security policy has not been downloaded, then the type field may have a status of incomplete.

At a next step 112, the deployment application program may analyze the type field to determine the next course of action.

Accordingly, by implementing a type field, the RFID deployment technique provides an entity with the latitude for implementing the technique that may best it the entity's need. In an example, an entity with a fairly simple security policy may be able to store the entire security policy onto the RFID chip. In another example, a research department that handles sensitive data may opt to only store instruction for downloading the security policy from the network on the RFID chip in order to maintain tighter security control.

If the type field indicates that the entire security policy has been stored on the RFID chip, then at a next step 114, the deployment application program may continue to parse the downloaded data to extract the policy.

At a next step 116, the deployment application program may install the security policy on the electronic device, thereby enabling the electronic device to access the entity's network.

Referring back to step 112, if the type field indicates that the security policy is stored on the entity's network, then at a next step 118, the deployment application program may connect to the policy server by applying the instructions that may have been provided in the downloaded data. In an embodiment, the type field may also include connection data (e.g., IP address, port, MAC address, gateway, etc.) that the deployment application program may employ to connect to the policy server.

In contrast to the prior art, the network configuration required to connect to the network may be automatically performed by the deployment application program, thereby requiring substantially minimal human intervention. As a result, the RFID deployment technique may substantially reduce user's frustration by removing the requisite that the user has the skill to perform network configuration manipulation. Additionally or alternatively, the entity may experience cost-saving by substantially eliminating the need for IT support in installing and updating the security policy.

Once the connection has been established with the policy server, then at a next step 120, the deployment application program may download the security policy.

At a next step 116, the deployment application program may install the security policy on the electronic device, thereby enabling the electronic device to access the entity's network.

As can be appreciated from the foregoing, the RFID deployment technique enables the user's electronic device to communicate with the entity's network even though the user has not yet logged onto the network system. The communication between the user's electronic device and the entity's network is a one-way channel in that the user's electronic device is able to read and download data onto the user's electronic device but is unable to write to the network. Accordingly, the deployment application program is able to retrieve the data (e.g., security policy) necessary from the entity's network to configure the user's electronic device in accordance with the entity's security policy. However, a malicious user may be unable to vandalize the entity's network since the communication channel is a one-way channel, with the user being unable to write to the entity's network. As a result, no damage may occur to the entity's network unless the user is able to successfully log onto the network. In contrast, if a user is allowed to log onto the network in order to receive security data, there is a risk that the user can hack the network during the initial communication.

Additionally, the RFID deployment technique may be implemented with an encryption arrangement to provide an additional security measure.

Figure 2:
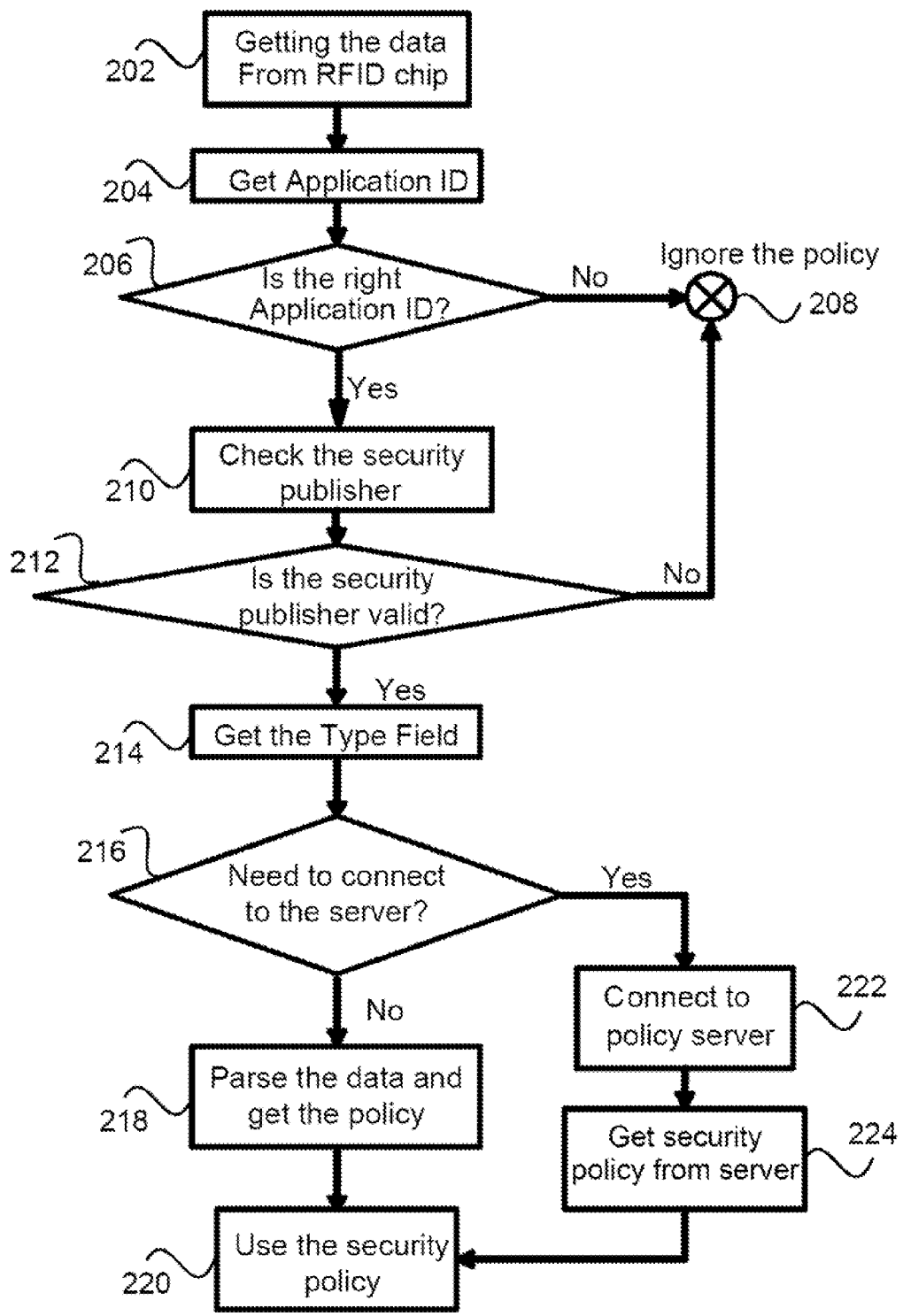
FIG. 2 shows, in an embodiment of the invention, a simple flowchart illustrating a technique for deploying an encrypted security policy through an RFID arrangement.

FIG. 2 shows, in an embodiment of the invention, a simple flowchart illustrating a technique for deploying an encrypted security policy through an RFID arrangement.

Steps 202-208 are similar to steps 102-108 of FIG. 1.

At a first step 202, an RFID reader may be employed to access data on an RFID chip. Once the data has been located, the data on the RFID chip may be downloaded onto the electronic device.

At a next step 204, a deployment application program may be employed to parse the downloaded data to extract the application ID.

At a next step 206, the deployment application program validate the authenticity of the downloaded data by comparing the application ID stored on the downloaded data file against a list of valid application IDs that may be programmed into the deployment application program. If the application ID is invalid, then at a next step 208 the deployment application program may stop processing the downloaded data and/or display an error message.

However, if the application ID is valid, then at a next step 210, the deployment application program may verify the security publisher of the downloaded data. As an additional form of security measure, the downloaded data may be encrypted. As can be appreciated from the foregoing, the encryption arrangement that may be implemented may depend upon the entity's preference. In an example, an asymmetric cryptography method may be employed in which a set of private-to-public keys may be utilized to encrypt and decrypt the data. In another example, a symmetric cryptography method may be employed in which a single key may be employed to encrypt and decrypt the data. As can be appreciated from the foregoing, embodiments of the invention are not limited by the type of encryption method that may be applied.

If the security publisher is invalid at a next step 212, then the deployment application program may stop processing, at next step 208. Consider the situation wherein, for example, a valid security policy has been encrypted. Since the deployment application program is tailored specifically for an entity, the deployment application program may be programmed with the key for decrypting the security policy, in an embodiment. The security policy may be deemed invalid if the decryption application program is unable to decrypt the security policy. In another example, the security policy may be deemed invalid if the security policy is unencrypted. If either situation occurs, then the decryption application program may terminate the installation process since the security policy may be considered as unsafe.

By implementing the additional security measure, the RFID deployment technique provides an additional assurance to the user that a valid security policy is being installed on his electronic device. Thus, the RFID deployment technique may provide further protection against unscrupulous individuals attempting to install unauthorized and even malicious code onto the user's electronic device.

Referring back to step 212, if the security publisher is valid, then at a next step 214, the deployment application program may continue to parse the data to retrieve the type field.

Steps 216-224 are similar to steps 112-120 of FIG. 1.

At a next step 216, the deployment application program may analyze the type field to determine the next course of action.

If the type field indicates that the entire security policy has been stored on the RFID chip, then at a next step 218, the deployment application program may continue to parse the downloaded data to extract the policy.

At a next step 220, the deployment application program may install the security policy on the electronic device, thereby enabling the electronic device to access the entity's network.

Referring back to step 216, if the type field indicates that the security policy is stored on the entity's network, then at a next step 222, the deployment application program may connect to the policy server by applying the instructions that may have been provided in the downloaded data.

Once the connection has been established with the policy server, then at a next step 224, the deployment application program may download the security policy.

In an embodiment, the security policy may be encrypted. Similar to the discussion above, the encryption arrangement that may be employed to encrypt the security policy may vary depending upon an entity's preference. Again, the deployment application program may include code for decrypting the encrypted security policy. If the deployment application program is unable to perform the decryption, then the security policy is not downloaded. However, if the deployment application program is able to decrypt the security policy, then the security policy is installed at next step 220, thereby enabling the user to access the entity's network.

It is contemplated that embodiments of the invention are not limited to security policy deployment. In an embodiment, the above techniques may be employed to deploy configuration. In an example, firewall configuration may be deployed utilizing the techniques described in FIG. 1 and/or 2.

Consider the situation wherein, for example, a new user has been hired by a company. In the prior art, the configuration of the firewall of a user's laptop may require the user to have the knowledge to perform configuration and/or may require support from the IT staff. Instead, the user may employ an RFID reader to access the firewall configuration stored on an RFID tag. Once the data has been downloaded onto the laptop, a deployment application program may be utilized to install the firewall configuration, employing the aforementioned steps from either FIG. 1 or FIG. 2.

In another implementation, the RFID deployment technique may be employed to deploy mobile security product. Similar to the techniques discussed in the aforementioned examples, the same techniques may be employed to deploy security products to mobile products, such as smart devices, mobile telephones, and the likes. As can be appreciated from the foregoing, the limitation to RFID deployment technique may depend upon the memory size of the RFID chip. As the capacity of the RFID chip increases, the type of deployment that may be implemented may be expanded to include more complex deployment, such as operating system deployment.

As can be appreciated from the foregoing, the RFID deployment technique provides a user-friendly approach for deploying services and products. With embodiments of the present invention, services and products, such as security policy and firewall configuration, may be deployed and installed with virtually no human interference. By automating the task that a human user would typically perform in installing new services and products, the RFID deployment technique reduces user's frustration and minimizes human errors. In addition, cost-saving may be realized since an entity may substantially reduce the cost for maintaining an IT staff for performing and supporting deployment.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for facilitating connection between a network associated with an entity and a first electronic device, the method comprising:
   receiving, using an RFID (radio frequency identification) reader associated with said first electronic device, a first file from an RFID tag, said RFID tag being provided by said entity;
   parsing said first file to obtain a type field, said type field indicating whether connection information for performing said connection is stored in said RFID tag or stored in a policy server on said network, said connection information including at least one of a security policy and a network configuration;
   determining, based on said type field obtained from said first file, whether to further parse said first file to extract said connection information or to connect said first device to said policy server to download said connection information through a one-way channel, said one-way channel prohibiting said first electronic device from writing to said network;
   obtaining, based on a result of said determining, said connection information from at least one of said first file and said policy server; and
   enabling a login via said first electronic device into said network using said connection information and using a connection modality different from a wireless modality employed to receive said first file from said RFID tag,
   wherein said type field includes a data string providing at least a download status about said security policy, said download status indicating whether said security policy has been completely downloaded to said first electronic device.

2. The method of claim 1 further comprising: parsing said first file to obtain a first application identification (ID) for authenticating said first file; and
   comparing said first application ID against a set of application IDs, said set of application IDs being unique identifiers associated with said entity, said set of application IDs being included in an application program installed on said first electronic device.

3. The method of claim 1 further comprising further parsing said first file to extract said connection information from said first file.

4. The method of claim 1 wherein said download status is a complete status, said complete status indicating that a complete copy of said security policy has been downloaded to said first electronic device.

5. The method of claim 1 wherein said download status is an incomplete status, said incomplete status indicating that said first electronic device does not include a complete copy of said security policy.

6. The method of claim 1 wherein said type field includes instructions for connecting to said policy server on said network associated with said entity through said one-way channel.

7. The method of claim 1 wherein said obtaining is downloading said connection information from said policy server through said one-way channel, and wherein said enabling said login is performed using said connection information downloaded through said one-way channel.

8. The method of claim 1 further comprising validating a security publisher of said first file using an application program installed on said first electronic device.

9. A system for facilitating connection between a network associated with an entity and a first electronic device, the arrangement comprising:
   an RFID (radio frequency identification) tag, said RFID tag being provided by said entity;
   an RFID reader, said RFID reader being associated with said first electronic device, said RFID reader being configured to receive a first file from said RFID tag;
   a deployment application program, said deployment application program executing on said first electronic device and being configured to parse said first file to obtain a type field, said type field indicating whether connection information for performing said connection is stored in said RFID tag or stored in a policy server on said network, said connection information including at least one of a security policy and a network configuration;
   first code for determining, based on said type field obtained from said first file, whether to further parse said first file to extract said connection information;
   second code for further parsing, based on a result of said determining, said first file to obtain said connection information from at least said first file;
   third code for enabling a login via said first electronic device into said network using said connection information and using a connection modality different from a wireless modality employed to receive said first file from said RFID tag; and
   circuits for performing one or more tasks associated with one or more of said deployment application program, said first code, said second code, and said third code;
   wherein said type field includes a data string providing a download status about said security policy, said download status indicating whether said security policy has been completely downloaded to said first electronic device.

10. The system of claim 9 further comprising:
    fourth code for parsing said first file to obtain a first application identification (ID) for authenticating said first file; and
    fifth code for comparing said first application ID against a set of application IDs, said set of application IDs being unique identifiers associated with said entity, said set of application IDs being included in said deployment application program, said deployment application program being installed on said first electronic device.

11. The system of claim 9 wherein said download status is one or a complete status and an incomplete status, said complete status indicating that a complete copy of said security policy has been downloaded to said first electronic device, said incomplete status indicating that said first electronic device does not include a complete copy of said security policy.

12. The system of claim 9 further comprising fourth code for connecting said first device to said policy server to download said connection information through a one-way channel, said one-way channel prohibiting said first electronic device from writing to said network.

13. The system of claim 9 wherein said type field includes instructions for installing said security policy onto said first electronic device using said deployment application program, said deployment application program including code for downloading a complete copy of said security policy from said policy server on said network through said one-way channel.

14. The system of claim 9 further comprising fourth code for validating a security publisher of said first file using said deployment application program.

15. A method for facilitating connection between a network associated with an entity and a first electronic device, the method comprising:
  receiving, using an RFID (radio frequency identification) reader associated with said first electronic device, a first file from an RFID tag, said RFID tag being provided by said entity;
  parsing said first file, using a deployment application program, to obtain a type field, said deployment application program executing on said first electronic device, said deployment application program being configured to facilitate interaction between said first electronic device and said RFID tag, said type field indicating whether connection information for performing said connection is stored in said RFID tag or stored in a policy server on said network, said connection information including at least one of a security policy and a network configuration;
  identifying a first application identification (ID) for authenticating said first file;
  comparing said first application ID against a set of application IDs, said set of application IDs being unique identifiers associated with said entity, said set of application IDs being included in said deployment application program executing on said first electronic device;
  determining, based on said type field obtained from said first file, whether to further parse said first file to extract said connection information or to connect said first device to said policy server to download said connection information through a one-way channel, said one-way channel prohibiting said first electronic device from writing to said network;
  obtaining, based on a result of said determining, said connection information from at least one of said first file and said policy server; and
  enabling a login via said first electronic device into said network using said connection information and using a connection modality different from a wireless modality employed to receive said first file from said RFID tag;
  wherein said type field includes a data string providing at least a download status about said security policy, said download status indicating whether said security policy has been completely downloaded to said first electronic device.

16. The method of claim 15 wherein said connection information includes at least said network configuration.

17. The method of claim 15 wherein said type field includes instructions for connecting to said policy server on said network associated with said entity through said one-way channel.

18. The method of claim 15 wherein said obtaining is downloading said connection information from said policy server through said one-way channel, and wherein said enabling said login is performed using said connection information downloaded through said one-way channel.

19. The method of claim 15 further comprising validating a security publisher of said first file using said deployment application program.

* * * * *